United States Patent
Moerdijk

(10) Patent No.: US 7,523,492 B2
(45) Date of Patent: Apr. 21, 2009

(54) SECURE GATEWAY WITH PROXY SERVICE CAPABILITY SERVERS FOR SERVICE LEVEL AGREEMENT CHECKING

(75) Inventor: Ard-Jan Moerdijk, Rijen (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 762 days.

(21) Appl. No.: 10/487,016

(22) PCT Filed: Aug. 21, 2001

(86) PCT No.: PCT/NL01/00614

§ 371 (c)(1),
(2), (4) Date: Jul. 28, 2004

(87) PCT Pub. No.: WO03/017619

PCT Pub. Date: Feb. 27, 2003

(65) Prior Publication Data

US 2007/0038762 A1    Feb. 15, 2007

(51) Int. Cl.
*G06F 9/00* (2006.01)
(52) U.S. Cl. ............... 726/12; 726/3; 726/11; 709/229
(58) Field of Classification Search ............ None
See application file for complete search history.

(56) References Cited

U.S. PATENT DOCUMENTS

| 6,237,037 B1 * | 5/2001 | Larsson ............ 709/229 |
| 6,571,140 B1 * | 5/2003 | Wewalaarachchi et al. .... 700/83 |
| 6,714,987 B1 * | 3/2004 | Amin et al. ............ 709/249 |

FOREIGN PATENT DOCUMENTS

WO    WO-0079811    12/2000

* cited by examiner

*Primary Examiner*—Pramila Parthasarathy

(57) ABSTRACT

The present invention describes a gateway in an Open Service Access (OSA) network where Service Level Agreement (LSA) checks are performed by a Framework (15) on a Central Gateway node (1). A distinction is made between applications (10) that can be trusted, like applications provided by the same firm as the gateway, and other applications (12) that are not trusted for security reasons. Access request coming from the applications for accessing Service Capability Servers (SCSs) (4, 5) are checked by the framework (15). Now the trusted applications (10) can get direct access to the Service Capability Servers (4, 5), but the untrusted applications (12) are only allowed to access so-called proxy SCSs (9) on the Central Gateway node (1). The proxy SCSs (9) have the same interface as the SCSs (4, 5) running on the distant nodes (2, 3), and are downloaded by the Framework (15) from the distant SCS nodes (2, 3) to the Central Gateway node (1) during an initialization phase.

8 Claims, 3 Drawing Sheets

SECURE GATEWAY WITH PROXY SERVICE CAPABILITY SERVERS FOR SERVICE LEVEL AGREEMENT CHECKING

FIELD OF THE INVENTION

The present invention relates to Open Service Access (OSA) for the implementation of a third generation wireless phone system called Universal Mobile Telecommunications System (UMTS). The invention particularly relates to securing access to Service Capability Servers (SCSs).

BACKGROUND OF THE INVENTION

Due to the $3^{rd}$ generation network structure, applications within the UMTS Service Network can make use of core network functionality by means of open Application Program Interfaces (APIs). The open APIs, originally specified by the Parlay Group, are standardised within the 3rd Generation Partnership Project (3GPP) CN5 working group and the ETSI SPAN 12 group.

In the OSA architecture, the logical entities that implement the open APIs are called Service Capability Servers (SCSs). Additionally infrastructure APIs are specified called the Framework. Among other things, the Framework provides an API for registering an SCS, see Technical Specification Group Core Network, Open Service Access, Application Programming Interface, Part 3: Framework (Release 4), 3GPP Techn. Spec. 29.198-3 V4.1.0 (2001-06). See also ETSI ES 201 915-3 V0.0.4 (2001-06) Open Service Access; Application Programming Interface; Part 3: Framework.

Several ways of implementing the APIs in a network are thinkable. One way is to provide all API implementations within one physical network node (i.e., both the OSA Framework and SCS in the same node having protocols/interfaces to the various core network entities). This could be called a physical or single OSA gateway. A second way is a distributed approach. In this case, one node comprises central infrastructure software (Framework) and maybe a few SCS components, but the rest of the SCSs run on different nodes. Now, the OSA gateway is a logical gateway and API implementations can run on distributed nodes (i.e., SCSs). This means that the different entities provide their own APIs. This approach could be called logical or distributed OSA gateway.

Security in OSA is very important because applications can also be provided by other business domains than the network operator who provides the network capabilities. In practice, it might be that the network operator puts restrictions on the functionality of a certain SCS to be used by an application. What is allowed or not allowed, is defined by so-called Service Level Agreements (SLAs). A Service Level Agreement may consist of an off-line (e.g. by physically exchanging documents) and an on-line part. An application has to sign the on-line part of a service agreement before it is allowed to access any network service capability feature.

In P. Bhoj et al., SLA management in federated environments, Computer Networks, 35 (2001) page 5-24, an architecture is described that uses contracts based on service level agreements to share selective management information across administrative boundaries. The design of a prototype implementation for automatically measuring, monitoring, and verifying SLAs for Internet services is also described.

The physical or single node gateway approach has disadvantages from a performance point of view as all the communication has to go via the OSA gateway node. The distributed approach has disadvantages from a security point of view because applications need to get direct access to the network nodes. A big advantage of the latter approach is that no implementation of the SCS software at the central gateway node is necessary for introducing new SCSs. In case of a true physical gateway solution, of course for each new SCS new software has to be implemented on the gateway.

SUMMARY OF THE INVENTION

The problem to be solved by the present invention is to provide a system and method that overcome the disadvantages of the prior art approaches.

The present invention relates to a gateway node for an open service access network between one or more applications and one or more external service capability servers on service capability server nodes, comprising a framework, characterised in that said framework is arranged to perform security checks on requests from applications to get access to one or more of the external service capability servers using service level agreements, stored in a database; classify the applications in trusted and untrusted applications, and give a trusted application direct access to said service capability servers but give any untrusted application only access to proxy service capability servers running on the gateway node.

In the present invention the physical and logical gateway approach are combined to benefit from both prior art approaches.

Also, the present invention relates to a gateway node as described above, wherein said framework is arranged to initiate downloading of application program interface functionality from said service capability servers to said gateway node forming said proxy service capability servers.

Futhermore, the present invention relates to a method of a gateway node, comprising the steps of:
(a) receiving a request from an application to access a service capability server external to said gateway node, characterised in that the method also comprises the steps of:
(b) downloading of application program interface functionality from said service capability servers to the gateway node forming a proxy service capability servers;
(c) classifying the application into either a trusted or an untrusted application;
(d) requesting said external service capability server to create an object instance implementing the application program interface functionality;
(e) sending a reference to said object instance to said application if it is a trusted application;
(f) sending a reference to said proxy SCS to said application if it is an untrusted application;
(g) operating said proxy service capability servers to enable controlled communications between said untrusted application and said service capability server.

In the present invention on the fly software can be provided to a node in the network that can deal with the checking of the Service Level Agreement. This keeps the actual SCS from doing these checks and therefore trusted applications are not bothered with the SLA checking overhead. Meanwhile untrusted applications do not have direct access to the actual SCSs and have to go through one specific node, which is beneficial from a security point of view.

BRIEF DESCRIPTION OF THE DRAWINGS

Below, the invention will be explained with reference to some drawings, which are intended for illustration purposes only and not to limit the scope of protection as defined in the accompanying claims.

DESCRIPTION OF PREFERRED EMBODIMENTS

Figure 1:
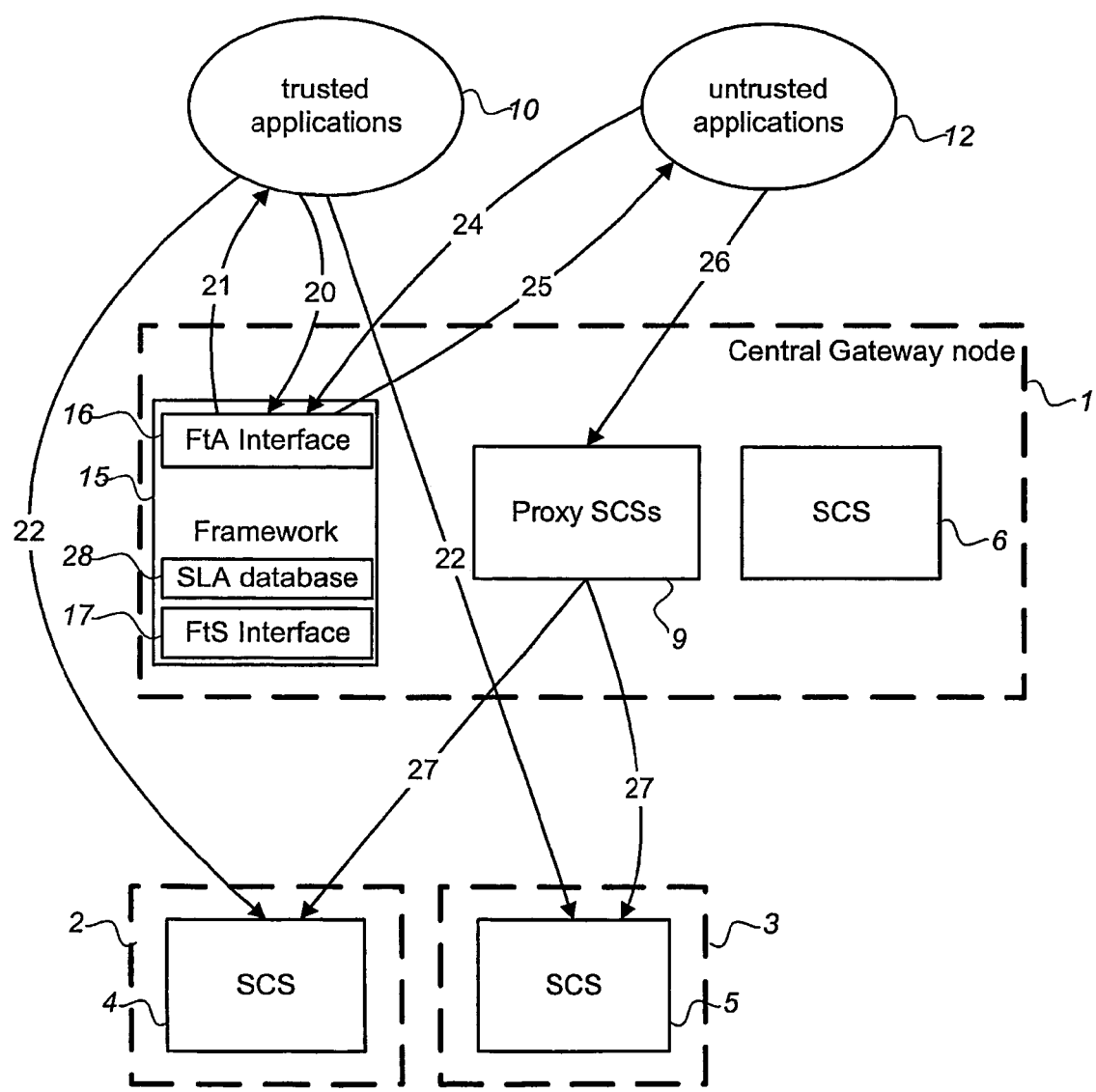
FIG. 1 shows a network system with a logical OSA Gateway with Proxy SCSs.

In FIG. 1, an example of a network system with a logical (distributed) OSA Gateway is shown. The logical OSA Gateway shown, contains a Central Gateway node 1, and two SCS nodes 2, 3. In FIG. 1 the physical nodes are depicted with dashed lines. On each of the SCS nodes 2, 3 one or more external SCSs 4, 5 are running. An internal SCS 6 may be present on the Central Gateway node 1 itself.

One of the main drivers behind OSA is opening of the networks also for parties outside the domain of the network operator (owning the SCSs and the rest of the core network). Applications provided within the same domain as the network operator are usually addressed as trusted applications, while applications provided by enterprises of a different domain (so-called 3rd parties) are usually addressed to as untrusted applications. That is why in FIG. 1 a distinction is made between trusted applications 10 and untrusted applications 12. The applications 10, 12 are depicted as ellipses. On Central Gateway node 1, a Framework 15 is able to communicate with the applications 10, 12 through Framework to Application (FtA) Interface 16. On the other hand, Framework 15 is communicating with the SCSs 4, 5, 6 through Framework to Service (FtS) Interface 17. One of the functions of the FtS Interface 17 is to register all the SCSs 4, 5, 6, so that they can be discovered by the applications 10, 12, using the FtA Interface 16.

In the present invention, the FtS-Interface 17 is extended by proxy initialisation software to make it possible to download one or more Proxy SCSs 9 from all the external SCSs 4, 5, to the Central Gateway node 1.

The Framework 15 has access to a database with Service Level Agreement information, referred to as SLA database 28. In FIG. 1, the SLA database 28 is situated in the Framework 15. However it should be understood that the SLA database 28 can also be situated outside the Framework 15, and can even be situated on another network node. Everytime an application 10, 12 is requesting access to one of the external SCSs 4, 5, Framework 15 will look in the SLA database 28 for SLA information. If the trusted applications 10 want to access the external SCSs 4, 5, they first have to request the Framework 15 for a reference to the external SCSs 4, 5 see arrow 20. Then the Framework 15 checks to which extent the trusted applications 10 are allowed to use these external SCSs 4, 5, using the information in the SLA database 28. If access is allowed, the Framework 15 requests the SCSs 4, 5 to create an object instance, implementing the requested APIs, on the SCS nodes 2, 3. Next, the Framework 15 returns references to these objects to the trusted applications 10, see arrow 21. The trusted applications 10 can then access the SCSs 4, 5 on SCS nodes 2, 3 directly, see arrow 22.

If untrusted applications 12 want to access the SCSs 4, 5, they also have to request the Framework 15 for a reference to the different SCSs, see arrow 24. The Framework 15 also checks to which extent the untrusted applications 12 are allowed to use these SCSs 4, 5, using the information in the SLA database 28. In reply to that, the Framework 15 creates SCS proxies 9 for the different SCSs 4, 5 on the Central gateway node 1. Then, as in the case of the trusted application, the Framework 15 requests the external SCSs 4, 5 to create an object instance implementing the requested APIs, on the SCS nodes 2, 3. Next the Framework 15 returns references to the Proxy SCSs 9 to the untrusted applications 12, see arrow 25. In this way, the untrusted applications 12 only have access to the Proxy SCS 9, see arrow 26, and the Proxy SCS 9 only invoke the implementations at the distant SCS nodes 2, 3 in case the untrusted applications 12 are allowed the invocation according to the SLA, see arrow 27. This means that all untrusted applications 12 are handled by the (Firewall of the) Central gateway node 1 and do not communicate directly with the SCS nodes 2, 3. This is beneficial from a security point of view.

There are multiple ways on how to provide the Proxy SCSs 9 at the Central gateway node 1. One solution is that each time a Service instance for a particular application needs to be initiated, the Framework 15 contacts the distant SCSs 4, 5 by invoking a method (for example the getServiceManager( ) on the IpSvcFactory interface, see 3GPP Technical Specification 29.198) with an indication that a Proxy SCS 9 is needed at the central Gateway node 1. The SCSs 4, 5 then initiate the proxy Service software with the correct SLA checks and return this to the Framework 15 together with a reference to the Service instance that is created locally on the SCS node 2, 3. The reference to the Service instance will link the Proxy SCS 9 at the Central Gateway node 1 to the Service instance at the SCS node 2, 3.

Another solution is that during installation time the SCSs 4, 5 register a Proxy SCS 9 at the central Gateway node 1. Each time a Service instance is needed, the Framework 15 first contacts the Proxy SCS 9 by calling e.g. the getServiceManager( ) method on the IPSvcFactory, see 3GPP Technical Specification 29.198. The Proxy SCS 9 then contacts the distant SCS 4, 5 and makes sure the correct Service proxy at the Central gateway node 1 and Service instance at the SCS node 2, 3 is started. In a preferred embodiment, the new operation for registering a Proxy SCS 9 in the FtS Interface 17, could be named registerProxy( ) and is may be part of the IpFwServiceRegistration API, see 3GPP Technical Specification 29.198. A reference between the Proxy SCS 9 and the distant SCS 4, 5 is established by extending the current operation getServiceManager( ) on an interface, called the Service Factory API, with a parameter specifying a reference to the Proxy SCS 9. The downloading of the proxy SCS code is achieved by means of e.g. Java object serialisation. It is basically the same mechanism as downloading an applet in a client webbrowser.

Figure 2:
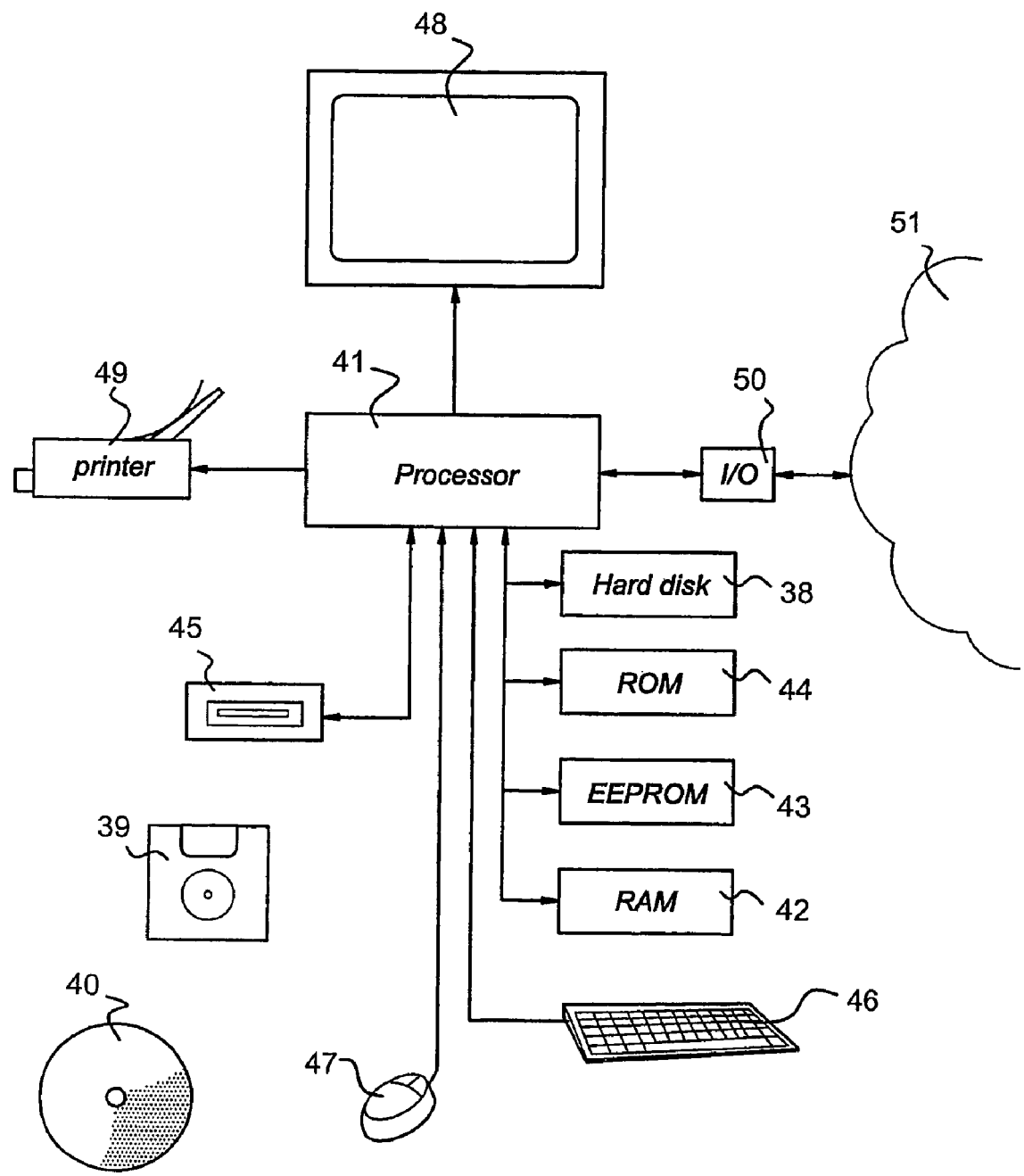
FIG. 2 shows a possible arrangement for a network node.

FIG. 2 shows a schematic block diagram of possible arrangement for a network node, like the Central Gateway node 1 and the SCS nodes 2, 3, comprising processor means 41 with peripherals. The processor means 41 is connected to memory units 38, 42, 43, 44 which store instructions and data, one or more reading units 45 (to read, e.g., floppy disks 39, CD ROM's 40, DVD's, etc.), a keyboard 46 and a mouse 47 as input devices, and as output devices, a monitor 48 and a printer 49. For data-communication to other nodes, an interface card 50 is provided that is connected to a network 51. Other input devices, like a trackball and a touch screen, and output devices may be provided for. The memory units shown comprise RAM 42, (E)EPROM 43, ROM 44 and hard disk 38. However, it should be understood that there may be provided more and/or other memory units known to persons skilled in the art. Moreover, one or more of them may be physically located remote from the processor means 41, if required. The processor means 41 are shown as one box, however, they may comprise several processing units functioning in parallel or controlled by one main processor, that may be located remote from one another, as is known to persons skilled in the art.

It is observed that both trusted and untrusted applications 10, 12 may run on a similar arrangement as shown in FIG. 2, including its alternatives as indicated above. Instead of physical I/O means 50, means for wireless communications (transmitters, receivers, transceivers) may be provided for. Applications 10, 12 may run on mainframes, PC's, handheld computers, laptops, and mobile devices like mobile phones.

Figure 3:
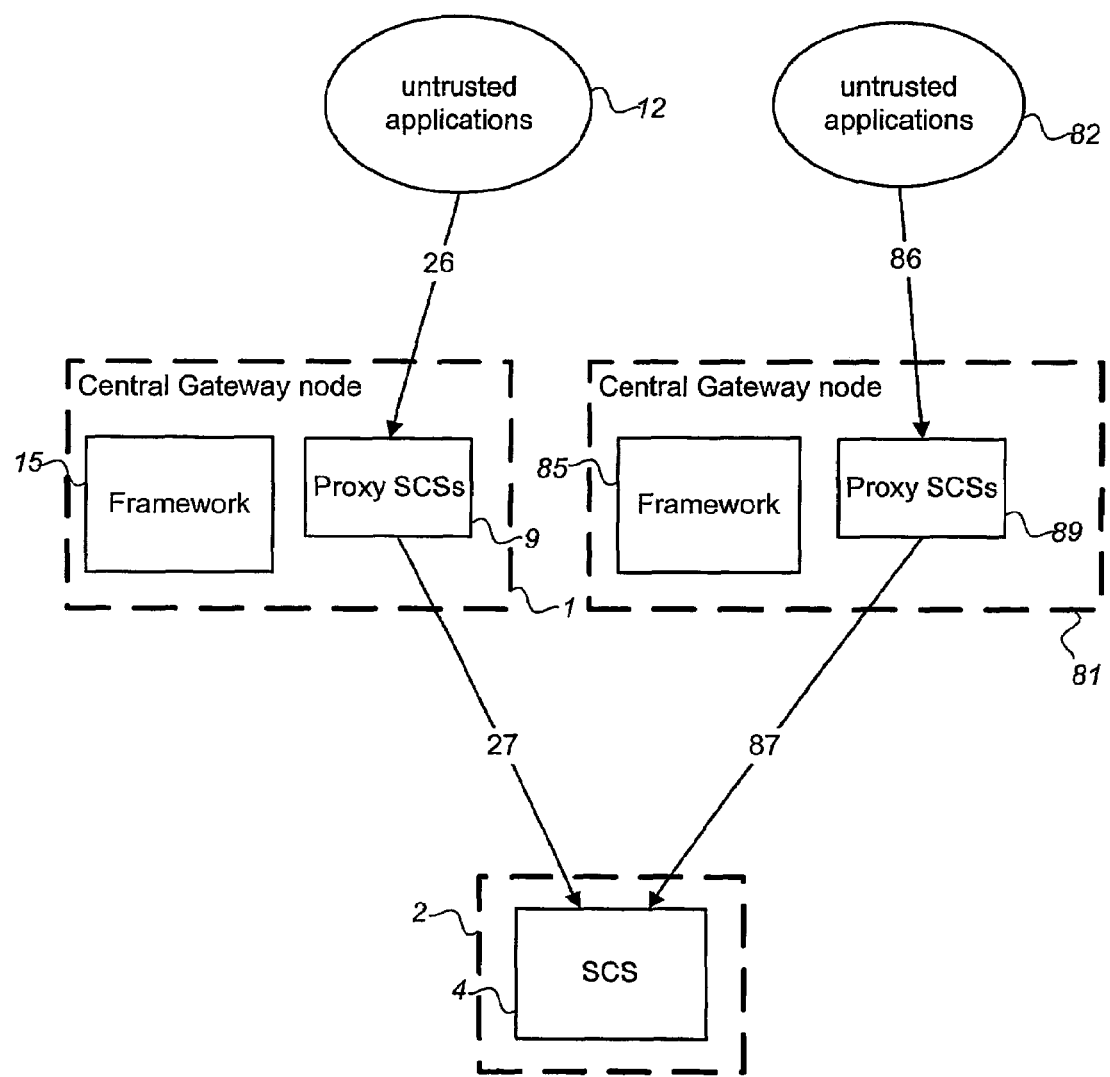
FIG. 3 shows a part of a network with two OSA Gateways.

FIG. 3 shows an embodiment of the present invention with two OSA Gateways. In FIG. 3 two Central Gateway nodes 1, 81 are shown. Both Gateway nodes 1, 81 can be accessed by trusted and untrusted applications at Application Servers of which only two untrusted applications 12, 82 are shown. One of the logical OSA Gateways comprises Central Gateway node 1 and SCS node 2. A second logical OSA Gateway comprises Central Gateway node 81 and SCS node 2.

In the situation of FIG. 3, two untrusted applications 12, 82 request access to an external SCS 4 running on a SCS node 2, via two separate Central gateway nodes 1, 81. Each Central Gateway node 1, 81 comprises a Framework 15, 85. The untrusted applications 12, 82 request the Frameworks 15, 85 for a reference to the external SCS 4. Now, Framework 15 will create a Proxy SCS 9 on the Central Gateway node 1, and Framework 85 will create a Proxy SCS 89 on the Central Gateway node 81.

Because in this example, both applications are untrusted, the Frameworks 15, 85 returns references to the Proxy SCSs 9, 89 to the untrusted applications 12, 82. The untrusted applications 12, 82 then only have access to the proxy SCSs 9, 89, see arrow 26 and 86 respectively. The Proxy SCSs 9, 89 will invoke implementations on the external SCS 4 (see arrows 27, 87) in accordance with SLAs stored at the corresponding Frameworks 15, 85.

In this case both applications are untrusted applications. It should be understood that several combinations of trusted and untrusted applications are possible, and that this example can be expanded by adding more applications and/or gateways and/or SCSs.

In the embodiments described above, the word "gateway" is used to describe a collection of APIs, which gives applications access to the core (telecom) network. In the embodiments a gateway comprises a Framework and one or more SCSs. However other configurations may be possible such as a gateway only comprising a Framework. It should be understood that the definition of gateway as used in the embodiment does not limit the scope of the present invention.

LIST OF ABBREVIATIONS

API Application Program Interface
OSA Open Service Access/Architecture
SCS Service Capability Server
SLA Service Level Agreement
UMTS Universal Mobile Telecommunications System

The invention claimed is:

1. A gateway node for an open service access network between one or more applications and one or more external service capability servers on service capability server nodes comprising:
    a database for storing service legal agreements associated with one or more of said applications;
    a proxy service capability server for communicating with one or more of said applications and said one or more external service capability servers;
    means for performing security checks on requests from applications to get access to one or more of the external service capability servers using service level agreements stored in said database;
    means for classifying the requesting applications as trusted and untrusted applications, and
    means for giving a trusted application direct access to said external service capability servers and means for giving an untrusted application only access to proxy service capability server running on the gateway node and said untrusted application communicating with said one or more external service capability servers through said proxy service capability server.

2. The gateway node according to claim 1, wherein said means for performing security checks is arranged to initiate downloading of application program interface functionality from said service capability servers to said gateway node forming said proxy service capability servers.

3. A method of a gateway node comprising the steps of:
    (a) receiving requests from an application to access one or more service capability servers external to said gateway node;
    (b) performing security checks on said requests using service level agreements, stored in a database;
    (c) downloading of application program interface functionality from said service capability servers to the gateway node forming proxy service capability servers;
    (d) classifying the application into either a trusted or an untrusted application;
    (e) requesting said external service capability server to create an object instance implementing said application program interface functionality;
    (f) sending a reference to said object instance to said application if it is a trusted application;
    (g) sending a reference to said proxy service capability servers to said application if it is an untrusted application;
    (h) operating said proxy service capability servers to enable controlled communications between said untrusted application and said service capability server.

4. The method of a gateway node, according to claim 3, wherein said proxy service capability servers are formed on said gateway node every time said one or more applications need access to said service capability servers.

5. The method of a gateway node, according to claim 3, wherein said proxy service capability servers are formed on said gateway node during an installation time of said gateway node.

6. A gateway node for providing communication between one or more applications and one or more service capability servers, comprising:
    (a) means for receiving requests from an application to access one or more service capability servers external to said gateway node;
    (b) means for performing security checks on said requests using service level agreements, stored in a database;
    (c) means for downloading of application program interface functionality from said service capability servers to the gateway node forming proxy service capability servers;
    (d) means for classifying the application into either a trusted or an untrusted application;
    (e) means for requesting said external service capability server to create an object instance implementing said application program interface functionality;
    (f) means for sending a reference to said object instance to said application if it is a trusted application;
    (g) means for sending a reference to said proxy service capability servers to said application if it is an untrusted application;

(h) means for operating said proxy service capability servers to enable controlled communications between said untrusted application and said service capability server.

7. The gateway node according to claim 6, wherein said proxy service capability servers are formed on said gateway node every time said one or more applications need access to said service capability servers.

8. The gateway node according to claim 6, wherein said proxy service capability servers are formed on said gateway node during an installation time of said gateway node.

* * * * *